United States Patent
Ma et al.

(10) Patent No.: US 6,215,516 B1
(45) Date of Patent: Apr. 10, 2001

(54) METHOD AND APPARATUS FOR MONOSCOPIC TO STEREOSCOPIC IMAGE CONVERSION

(75) Inventors: Kelvin Ma, Yorktown Heights; David Swift, Ossining, both of NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/466,045

(22) Filed: Dec. 17, 1999

Related U.S. Application Data

(62) Division of application No. 08/889,713, filed on Jul. 7, 1997, now Pat. No. 6,031,564.

(51) Int. Cl.$^7$ .................................................. H04N 13/00
(52) U.S. Cl. ........................ 348/43; 348/42; 345/419
(58) Field of Search ........................... 348/42–44, 96–97, 348/51, 571, 578, 580; 382/154; 345/328, 419, 326

(56) References Cited

U.S. PATENT DOCUMENTS

| | | | |
|---|---|---|---|
| 4,645,459 | 2/1987 | Graf et al. | 345/426 |
| 4,925,294 | 5/1990 | Geshwind et al. | 352/57 |
| 4,992,780 * | 2/1991 | Penna et al. | 345/139 |
| 5,040,005 | 8/1991 | Davidson et al. | 396/429 |
| 5,050,984 | 9/1991 | Geshwind | 352/38 |
| 5,479,603 | 12/1995 | Stone et al. | 345/326 |
| 5,510,831 * | 4/1996 | Mayhew | 348/47 |
| 5,510,832 | 4/1996 | Garcia | 348/56 |
| 5,511,153 | 4/1996 | Azarbayejani et al. | 345/419 |
| 5,523,886 * | 6/1996 | Johnson-Williams et al. | 359/464 |
| 5,581,638 * | 12/1996 | Givens et al. | 382/294 |
| 5,652,851 | 7/1997 | Stone et al. | 345/346 |
| 5,727,078 | 3/1998 | Chupaeu | 382/154 |
| 5,748,199 | 5/1998 | Palm | 345/473 |
| 5,808,664 | 9/1998 | Yamashita et al. | 348/42 |
| 5,973,700 * | 10/1999 | Taylor et al. | 345/427 |
| 6,005,967 * | 12/1999 | Nakagawa et al. | 382/154 |
| 6,031,564 * | 2/2000 | Ma et al. | 348/43 |

FOREIGN PATENT DOCUMENTS

| | | | |
|---|---|---|---|
| 0 735 512 A3 | 2/1996 | (EP) | G06T/15/10 |
| 0 798 666 A2 | 1/1997 | (EP) | G06T/15/00 |

OTHER PUBLICATIONS

B.J. Garcia, Ph.D. and R.J. Greenstein, M.D., "True–Stereoscopic Video Media from Monoscopic Sources: The DeepVision System for Minimally Invasive Surgery," Medical Applications, *Virtual Reality Systems*, pp. 52–57 (1994).

H. Murata, T. Okino, T. Iinuma, S. Yamashita, S. Tanase, K. Terada and K. Kanatani, "Conversion of Two–Dimensional Images to Three Dimensions, " SID 95 Digest, *Society for Information Display 1995 Symposium Proceedings* (1995).

Christopher Watkins, Alberto Sadun, Stephen Marenka, "Modern Image Processing: Warping, Morphing, and Classical Techniques," Academic Press Professional, Inc. (1993).

G.R. Engel, "An Investigation of Visual Responses to Brief Stereoscopic Stimuli," *Q. Jl exp. Psychol.* 22, 148–166 (1970).

Perry Hoberman, "Depth Painting: The Interactive Transformation of Existing Images Into Stereoscopic 3D," 78 SPIE vol. 2177.

* cited by examiner

*Primary Examiner*—Vu Le
(74) *Attorney, Agent, or Firm*—Fish & Neave; Joel Weiss; Gerow D. Brill

(57) ABSTRACT

A method and apparatus for converting a monoscopic image with one perspective to a stereoscopic image with two perspectives is provided. A foreground object is identified and outlined. The depth of the object is endowed with depth information. The second perspective is generated by image warping. Alternate embodiments comprising additional features, such as removing redundant frames, which reduce the necessary computation are also provided.

15 Claims, 10 Drawing Sheets

METHOD AND APPARATUS FOR MONOSCOPIC TO STEREOSCOPIC IMAGE CONVERSION

CROSS-REFERENCE TO RELATED APPLICATION

This application is a divisional application of application Ser. No. 08/889,713 filed Jul. 7, 1997 now U.S. Pat. No. 6,031,564.

BACKGROUND OF THE INVENTION

This invention relates to a method and an apparatus for converting monoscopic (i.e., two-dimensional) images into stereoscopic (i.e., three-dimensional) images, and more particularly using image warping.

The human brain perceives depth by receiving two different images, which are horizontally shifted relative to each other, from each eye. Such depth information is important for determining how far away an object is and the depth arrangements between various objects in a scene. Unfortunately, most images are recorded in monoscopic format on recording medium (e.g., motion picture film and video media) where some depth information is lost. However, even a monoscopic camera lens produces an image according to the laws of Cartesian space and perspective. If such an image could be processed to extract that information, and thus be converted into three-dimensional stereoscopic format, there could be a vast amount of stereoscopic material available for three-dimensional viewing.

There are several methods to generate stereoscopic images from monoscopic images. One method, the horizontal shift method, isolates several important objects in the image field and shifts them horizontally. B. J. Garcia, Ph.D. and R. J. Greenstein, M.D., "True-Stereoscopic Video Media from Monoscopic Sources: The DeepVision System for Minimally Invasive Surgery," *Medical Applications, Virtual Reality Systems*, pp. 52–57 (1994). The amount of the shift for each object varies according to its depth arrangement. The depth arrangement (also referred to as stereoscopic depth cue or binocular disparity) of an object can be set manually using cues such as shadows and the perspective within the monoscopic image. This process creates a stereoscopic image with depth perception between objects, but the objects themselves lack depth and appear to be flat cardboard cutouts.

Another method, the frame delay method, uses moving images to extract a second perspective. H. Murata, T. Okino, T. Iinuma, S. Yamashita, S. Tanase, K. Terada and K. Kanatani, "Conversion of Two-Dimensional Images to Three Dimensions," *SID 95 Digest, Society for Information Display* 1995 *Symposium Proceedings* (1995). When an object is in motion, a series of different perspectives is generated due to either the object's movement or the camera's motion. Different perspectives from different images in a time series can then be extracted to generate a second perspective for the stereoscopic effect. Though this technique can create very realistic three-dimensional effects, it requires that motion of both the camera and the objects be limited to a direction horizontal to the image frame's horizontal axis. The camera must move in a horizontal fashion perpendicular to the subject matter (this is called a "truck" in the motion picture industry). The reason for this perpendicular motion is that each stereoscopic image pair is formed by pairing up images which are delayed from each other. Because the camera is limited to sideways motion, the delay between images results in a parallel camera separation. If the camera were not moving in a perpendicular and horizontal manner, the image pairs would not be parallel and would not form a good stereoscopic image. Also, since this technique requires a series of images taken at different times, a single image cannot be converted.

In view of the foregoing, it would be desirable to be able to provide a method and an apparatus for converting monoscopic images into stereoscopic images which gives the appearance of depth to objects themselves, as well as the appearance of depth between objects. It would also be desirable to be able to convert images with vertical as well as horizontal object motion relative to the frame's horizontal axis. It would also be desirable to be able to convert a single image.

SUMMARY OF THE INVENTION

It is an object of the present invention to provide a method and an apparatus for converting monoscopic images into stereoscopic images which gives the appearance of depth to objects themselves, as well as the appearance of depth between objects.

It is also an object of the present invention to provide a method and an apparatus for converting images with vertical as well as horizontal object motion relative to the frame's horizontal axis.

It is another object of the present invention to provide a method and an apparatus for converting a single image.

These and other objects of the invention are accomplished in accordance with the principles of the invention by identifying at least one object in the monoscopic image with a first perspective, outlining the object to generate an outline, endowing the object with depth information and generating a second perspective by image warping the object.

Possible applications for such a method and apparatus include rapid conversion of existing monoscopic movie and video media, as well as still photograph (i.e., single image), libraries to stereoscopic images.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIG. 9b is a flow diagram of the tweening process used in the method shown in FIG. 9a.

The Appendix contains a listing of the symbolic mathematical program used to derive a generalized equation for shift.

DETAILED DESCRIPTION OF THE INVENTION

The present invention is a method and an apparatus for converting monoscopic images to stereoscopic images.

Stereoscopic images require two slightly offset perspective images in order to create a stereoscopic presentation with the appearance of depth. Most existing images stored in motion picture film, photographic or video media format contain only a single perspective and, therefore, appear flat. In order to create a three-dimensional image, a second perspective image must be obtained.

The second perspective image is preferably only slightly offset from the first perspective image. In accordance with the present invention, it is possible to generate the second perspective image from the first image. A system of techniques of shifting and warping objects within the first image can be implemented to automate the generation of the second perspective image.

Figure 4:
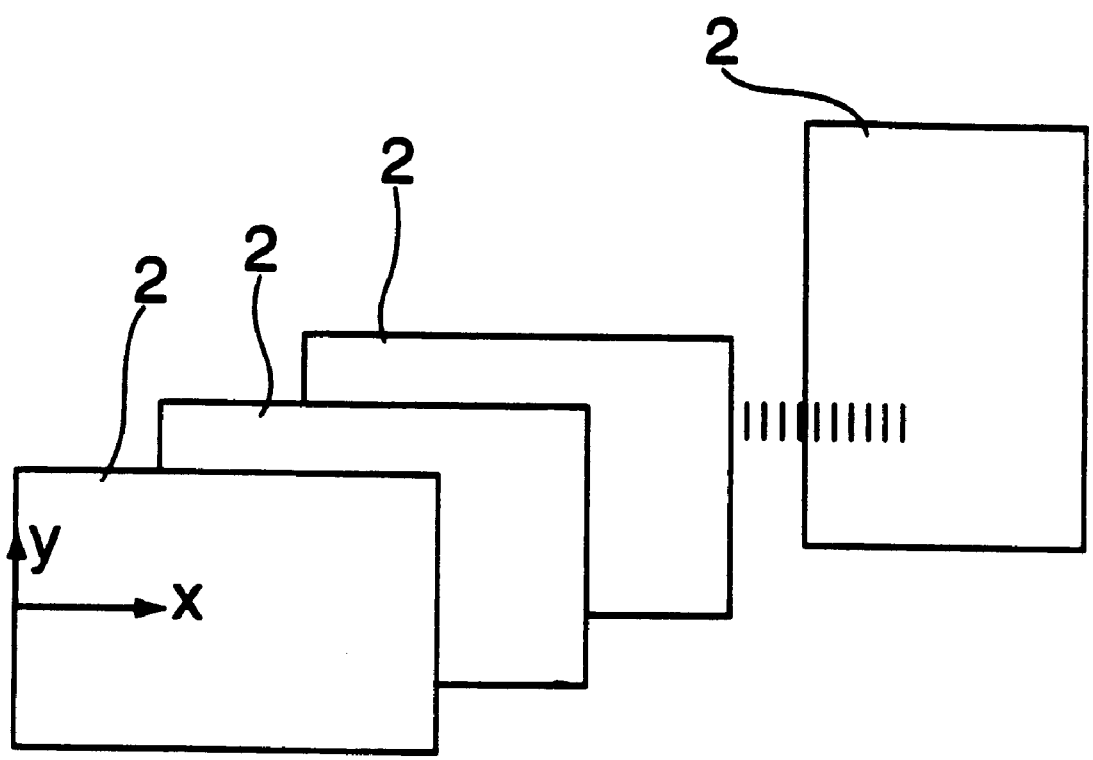
FIG. 4 illustrates a sequence of successive image frames and the image frame horizontal axis.

The technique of the present invention for converting monoscopic into stereoscopic images uses image warping techniques often used for morphing image objects from one shape into a different shape. Warping comprises two steps. First, the object's outlined shape is transformed into a new shape. This transformation preferably is primarily done by pixel interpolation. The interpolation can be either linear (for speed) or quadratic (for accuracy). Second, the pixels within the outlined shape of the image are interpolated where the boundary of the image outline expands or contracts. For stereoscopic image conversion, only pixel interpolation horizontal to the image frame axis (indicated by x in FIG. 4) is required, since the second perspective image is a slight horizontal shift from the first perspective image. This simplifies the procedure of image warping and helps speed up the transformation calculations. Indeed, a simple horizontal linear pixel interpolation can be achieved in close to real-time.

Objects are the components of an image which are manipulated to give the image depth. Examples of objects are tables, chairs, walls, floors, lights, people, etc. Objects can further be divided into sub-objects to add more depth. For example, a person could be broken into two arm objects, a head object, a body object, and two leg objects.

A frame is a single image at a specific time. NTSC video consists of 30 frames per second or 30 images per second. Sequential frames are the sequential images to be converted.

A key frame is a specific frame or image where input from the user is required to help direct the animation. The start and end of a new scene are key frames. Frames where objects start or stop motion are typically key frames.

Key objects are the important objects in the image which will be processed using this invention.

Clipping occurs when one object (the foreground object) obscures another object (the background object). The portions of the background object which are obscured are removed or not displayed and the foreground object is displayed instead.

To convert a series of moving images, a "tweening" process preferably is implemented to automate the outlining process. The tweening process involves interpolations of the vector outlined shape of all the outlined objects within the scene from one key frame ("the start key frame") to the next key frame ("the stop key frame"). The interpolation can be either linear or non-linear (e.g., spline) depending on accuracy and/or speed requirements. Only the end points (i.e., the key frames) of the motion path for the objects need to be defined, significantly reducing the burden on the operator.

In order to apply image warping to the stereoscopic conversion of moving images such as those recorded on motion picture film or video media, two sets of outlined objects are used to enable clipping. A first set of outlines is provided either by an automatic image recognition process and/or manually by an operator to outline vectors on all the necessary key objects within an image. This set of outlines is then shifted and warped through the perspective transformation based on the depth arrangement of the objects provided by the operator. When objects are outlined, a set of vectors are used to represent this. When vectors (outlines) from two objects intersect, vector-crossovers are created. The background vectors should be clipped to conform to the foreground vectors when this happens. Vector cross-overs can result in undesirable effects, therefore, a second set of outlined objects is generated after the perspective transformation.

Figure 3:
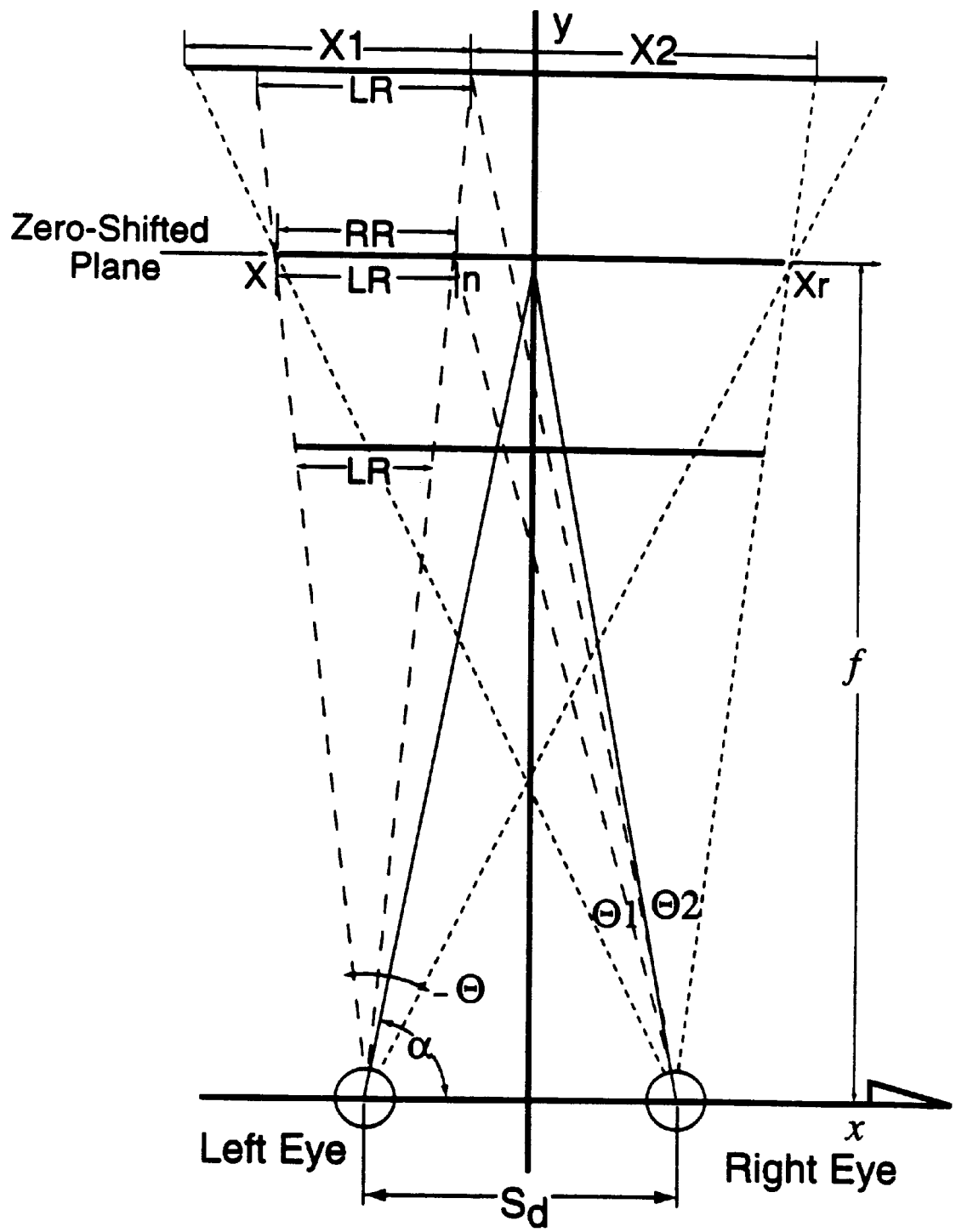
FIG. 3 illustrates a second perspective image geometry.

As shown in FIG. 3, if the coordinates of an object in the left perspective image are crossed with corresponding coordinates in the right perspective image (i.e., each left coordinate is moved to the right of the corresponding right coordinate), the result is negative parallax and the object appears to protrude toward the observer and away from the neutral plane. Conversely, if the coordinates are uncrossed (each right coordinate is moved to the left of the corresponding left coordinate), the result is positive parallax and the object appears to recede.

Whenever the foreground objects' vectors cross-over the background objects due to the transformation, the background object's vectors preferably are clipped to the edge of the foreground object's outline. This prevents any vector cross-over during the actual warping process which could cause unwanted warping artifacts. The entire process can be completely automated using conventional computer line clipping algorithms. Given two sets of vectors with one tagged as the foreground and one tagged as the background, it is well known by someone skilled in the art how to automatically clip the background vectors to the foreground. Algorithms like this are used for hidden line removal in computer graphics.

Figure 1:
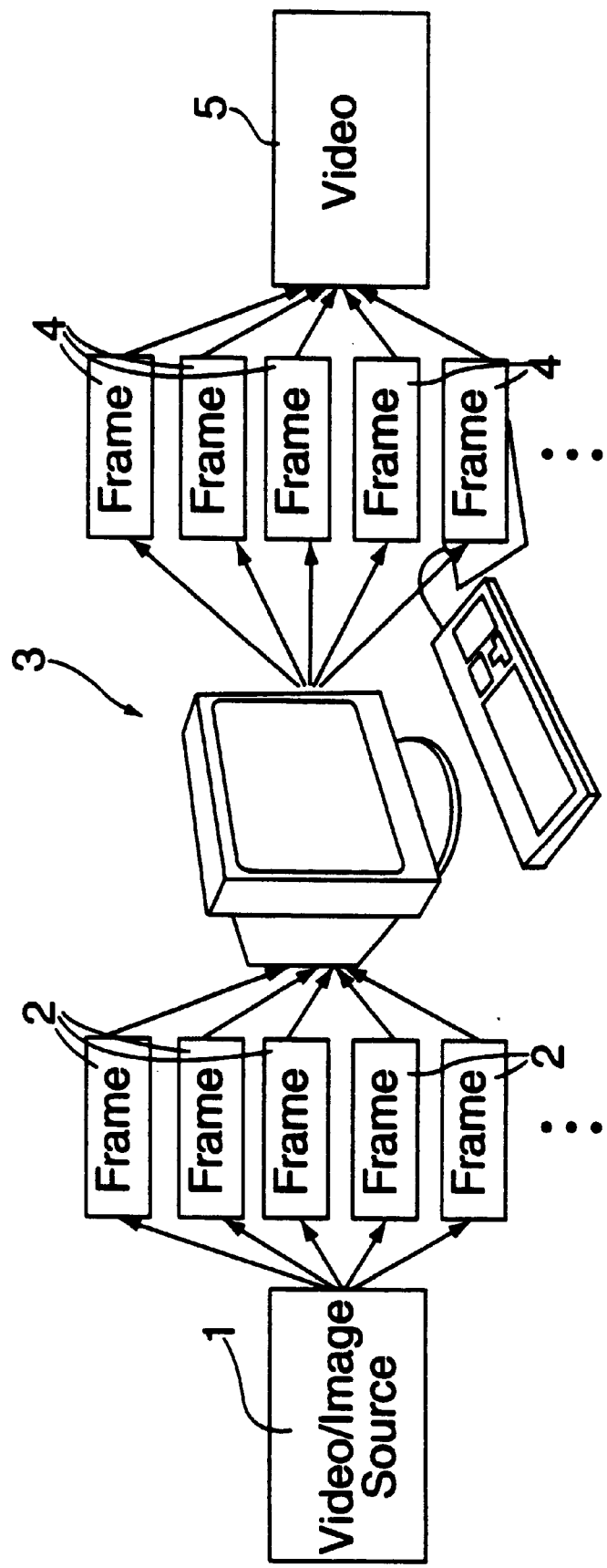
FIG. 1 illustrates a system for converting monoscopic images to stereoscopic images.

FIG. 1 shows two-dimensional video media images comprising unprocessed still frames 2 provided to workstation 3 through digital image capture using video media frame grabber 1. Processed still frames 4 are displayed in sequence on monitor 5.

Key objects are operator-selected foreground objects in a particular sequence of images. Key frames, which correspond to frames in which key objects change motion or deviate from a predicted motion path, can be identified automatically by delta pixel changes between frames. Delta pixel changes can also be used to determine the basic motion path within each scene. The key frames can be automatically selected based on the extreme points of the motion path. The key frames can also be selected by a human operator after viewing the scene. These key frames are then individually processed by outlining the key objects within the image.

Objects can be detected automatically by an edge detection algorithm or manually by an operator. Automatic edge detection algorithms such as Laplacian, Sobel and Prewitt convoluted filters can be used to highlight the object's outline. Such algorithms are described, for example, in Christopher Watkins, Alberto Sadun, Stephen Marenka, "Modern Image Processing: Warping, Morphing, and Classical Techniques," Academic Press Professional, Inc. (1993). The computer can then trace around the highlighted objects to form vector outlines. A vector is a line which connects points (i.e., the control points) on the object.

Once vector outlines are determined for objects within the image, the foreground priority of objects can be determined by first identifying objects which are enclosed within another object or objects which overlap another object. These objects are considered to be potential foreground objects and subject to further criteria such as intensity cue and vertical position cue.

Key objects can be identified by the operator as corresponding to certain predefined objects for predefined profile warping. Each predefined object preferably has a profile identification which defines its perceived surface profile. This predefined profile warping eliminates the need to define vectors within an object in order to recreate its full volume appearance.

The object's outline defines the area which will be transformed via perspective warping. Perspective warping is a type of image warping in which the image is horizontally shifted. Therefore, the actual transformation is significantly faster to compute because there is no vertical warping.

The object's outline is warped and the object's image within the outlined area is then warped into the necessary perspective. The control points of the outline are transformed into their new shape and position based on the depth arrangements and/or the object's profile identification. The actual transformation only shifts the end points of the vectors horizontally.

Figure 2:
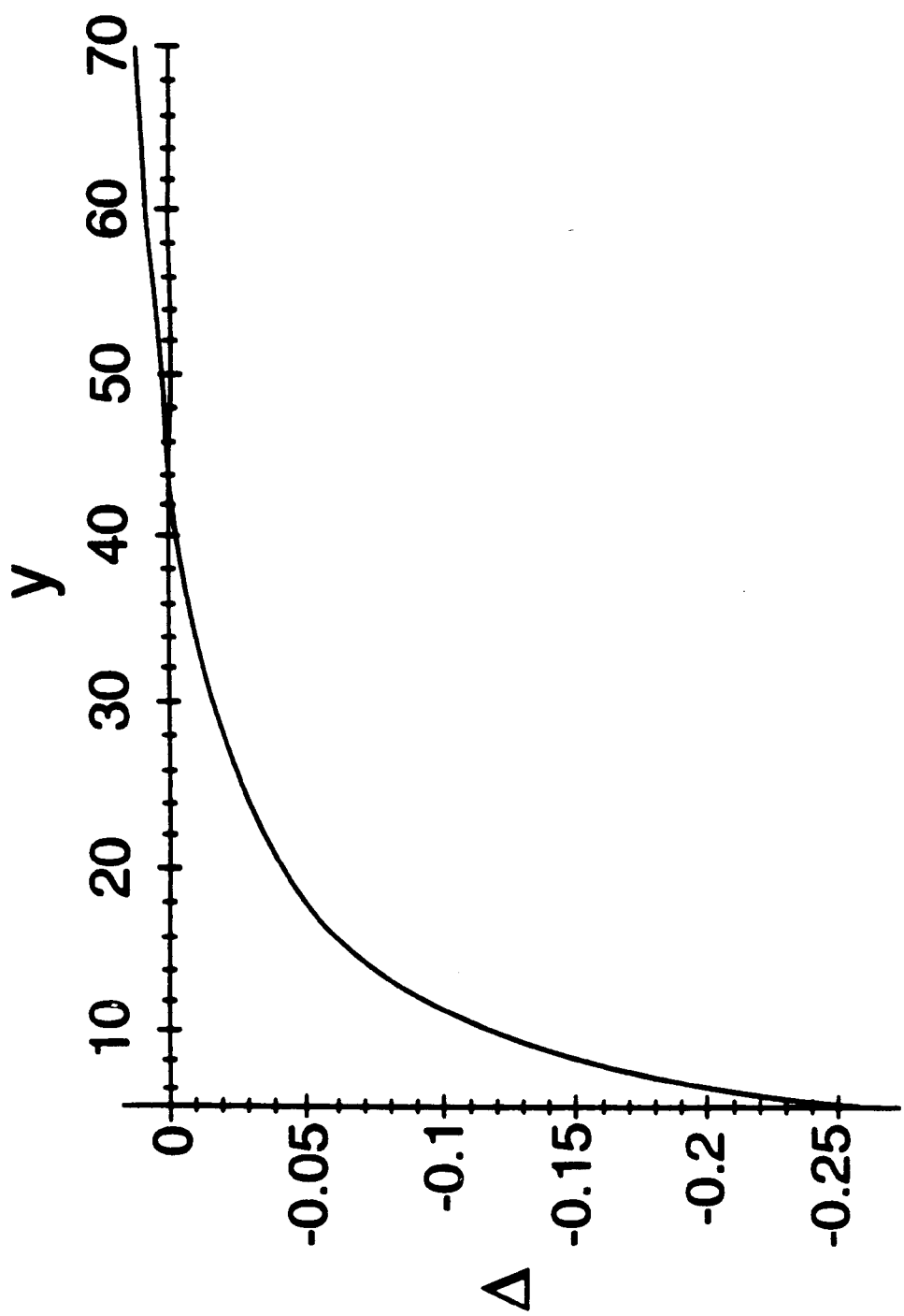
FIG. 2 is an actual perspective calculation curve.

The amount of the shift may be based, for example, on the computed depth as shown in FIG. 2, which shows the relationship between the distance from the eyes, y, versus the amount of relative shift, Δ, at any horizontal point x for a fixed focus distance of 45 inches and an eye separation distance of 3 inches. One should note that this position offset distance saturates rapidly as the depth becomes farther away. A more generalized equation was derived to calculate Δ, the amount of shift required for the right (i.e., second) perspective image from the left (i.e., first) perspective image at any particular depth relative to the width of the viewing screen, with reference to FIG. 3. The actual derivation was done using a symbolic mathematical program (Maple V). Maple is a computer algebra system, i.e., a computer program which manipulates mathematical expressions symbolically. Maple is able to solve equations, systems of equations and differential equations, perform differentiation and integration, do high precision arithmetic and draw accurate graphs in two and three dimensions. A listing of the Maple V code is listed in the Appendix which follows this specification and the resulting equation is shown below:

$$X_{old} = X_{new} \left[ \frac{S_1 - S_0}{T_1 - T_0} \right] + S_0$$

The calculation for the linear pixel interpolation is shown below:

$Red_{new}[X_{new}]=(1-frac(X)) \cdot Red_{old}[integer(X)]+frac(X) \cdot Red_{old}[integer(X)+1]$ $Green_{new}[X_{new}]=(1-frac(X)) \cdot Green_{old}[integer(X)]+frac(X) \cdot Green_{old}[integer(X)+1]$ $Blue_{new}[X_{new}]=(1-frac(X)) \cdot Blue_{old}[integer(X)]+frac(X) \cdot Blue_{old}[integer(X)+1]$ where: $X_{old}$ - old pixel position.
$S_0$ - Old left pixel boundary position.
$S_1$ - Old right pixel boundary position.
$X_{new}$ - New sampled pixel position.
$T_0$ - New left pixel boundary position.
$T_1$ - New right pixel boundary position.

Figures 5A, 5B:
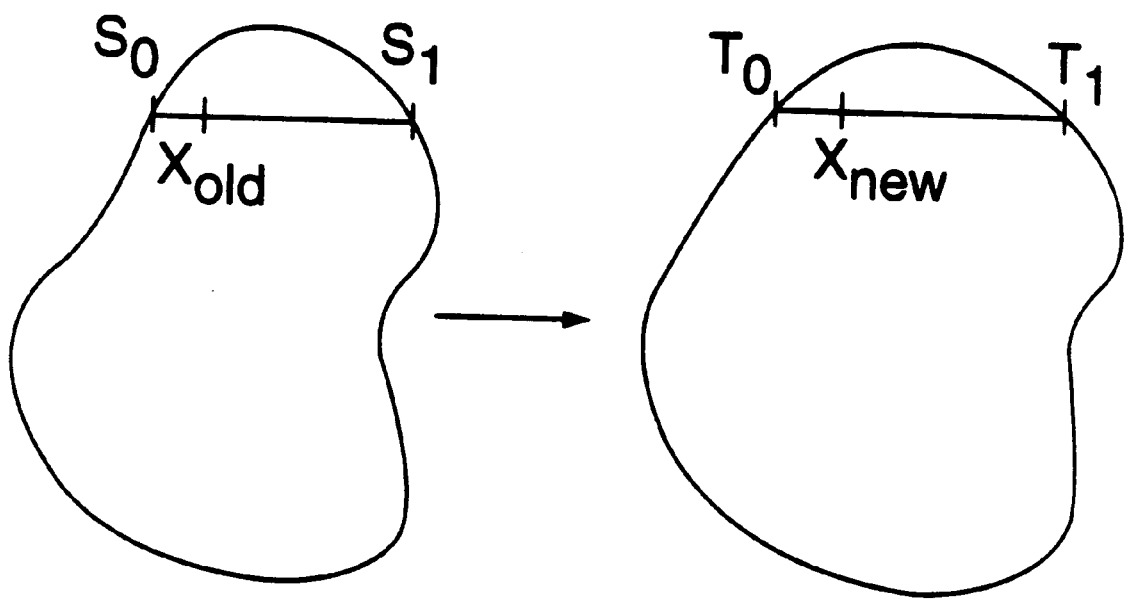
FIGS. 5a and 5b show pixel sampling.

As shown in FIG. 5, the pixels within the boundary shown in FIG. 5a are resampled to the new boundary shown in FIG. 5b. Since the number of pixels along the x axis is arbitrary, the new sampled pixels are not likely to map back to the original pixels.

For illustration purposes, consider that the left image is the original image and the right image is generated through perspective transformation. The operator will then select a neutral plane within the image. The neutral plane (also referred to as the "zero-shifted" plane) is that plane on which no point shifts between the left and right perspective image. Any point on a plane in front of the neutral plane shifts to the left and any point on a plane behind the neutral plane shifts to the right. The selection of the neutral plane is important to minimize the maximum shift required by the object. The neutral plane can be selected automatically by choosing the center plane between the front-most object and the back-most object. Manual adjustment by the operator is allowed for aesthetic reasons if the operator so chooses.

Objects in front of the neutral plane appear to float out of the viewing screen. This can produce undesirable effects due to object's partial appearance at the border of the screen. This creates an unnatural appearance as the object gets partially clipped by the border behind it instead of in front. This can be corrected by shifting the left and right frames horizontally so that the object is behind the viewing screen.

Figure 6:
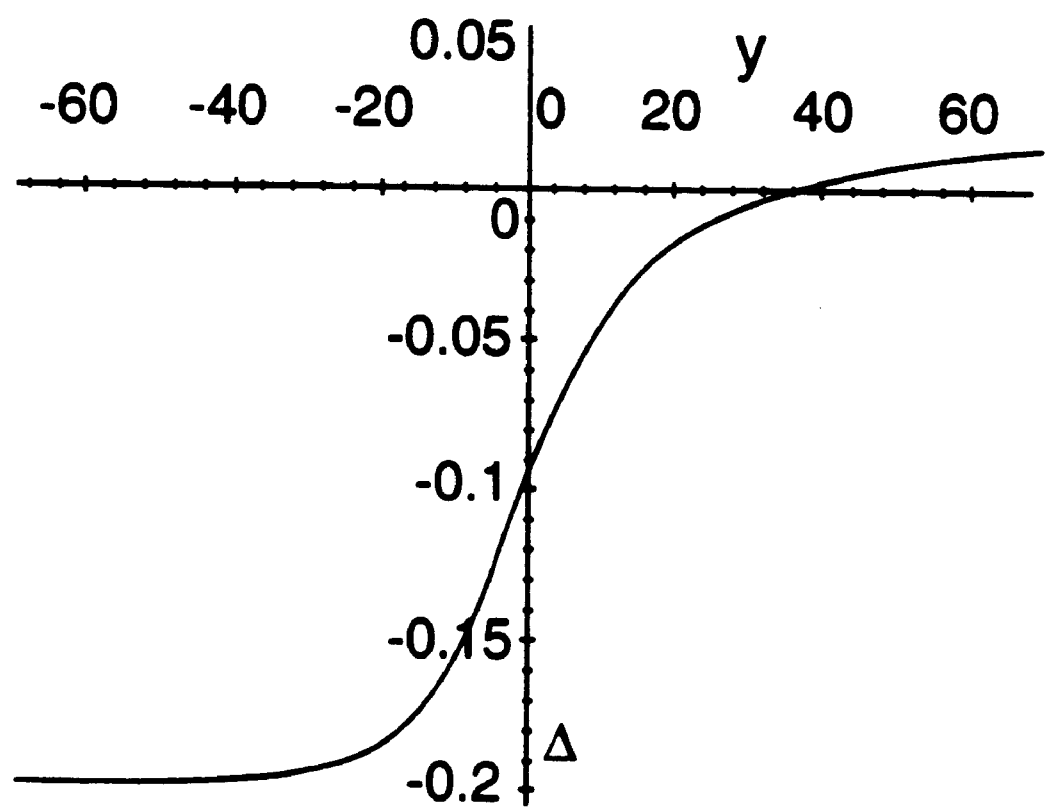
FIG. 6 is a modified (saturating) perspective calculation curve.

Other perspective calculation curves, such as the saturating perspective calculation curve shown in FIG. 6, can be used instead of the actual perspective calculation curve shown in FIG. 2. By using a modified perspective calculation curve to perform the perspective transformation, it is possible to avoid excessive image warping and distortion of the transformed image. A similar result can be achieved using the actual perspective calculation curve of FIG. 2 if the operator is prevented from setting the control points too far in front of the neutral plane.

Figure 7B:
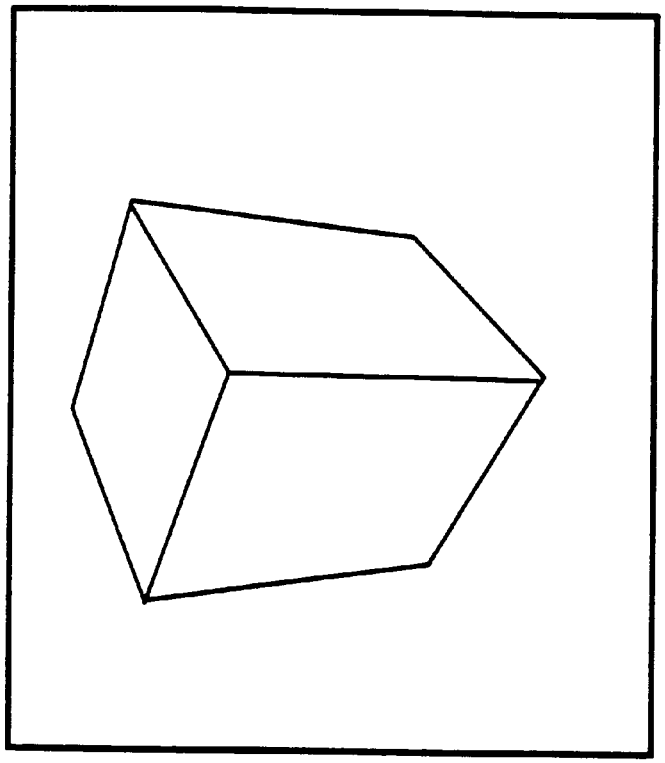
FIGS. 7a and 7b illustrate the transformation of a cube.
Figure 7A:
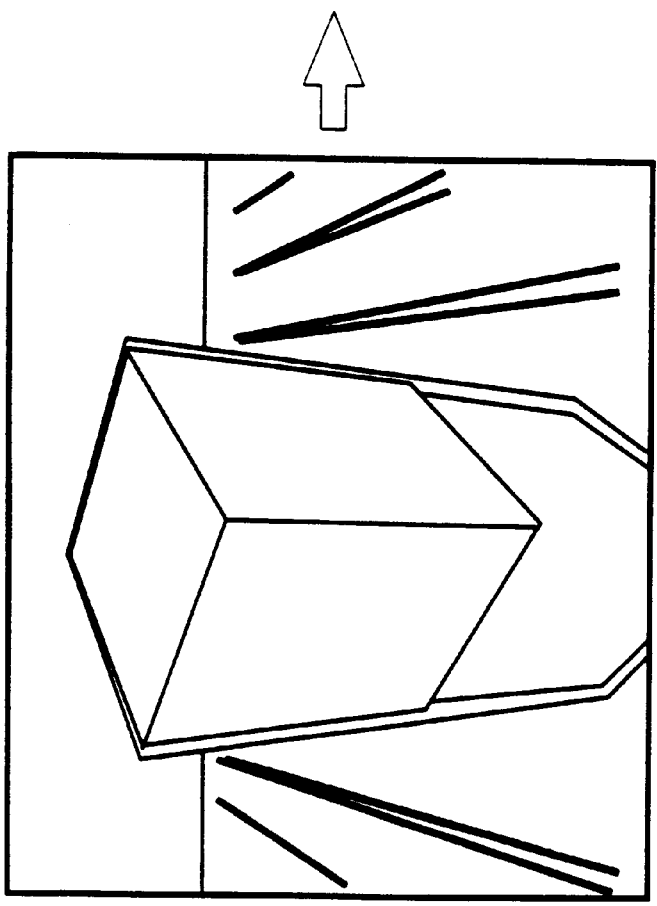

Once the main outlines of the object are determined within the scene, the object can be easily transformed into the second perspective image using a perspective transformation curve. To illustrate the technique, the transformation of a simple cube is shown in FIGS. 7a and 7b. FIG. 7a shows the left perspective image. FIG. 7b shows the right perspective image which results from the transformation. In this case, the main outlines are the edges of the cube and the control points are the eight corners of the cube. The control points are manipulated and depth arranged by an operator to determine the current position in depth. This perceived depth is then horizontally translated right to create the second perspective image. The resulting stereoscopic image can be displayed in quasi-real-time on a monitor to provide feedback to the operator.

Figure 8A:
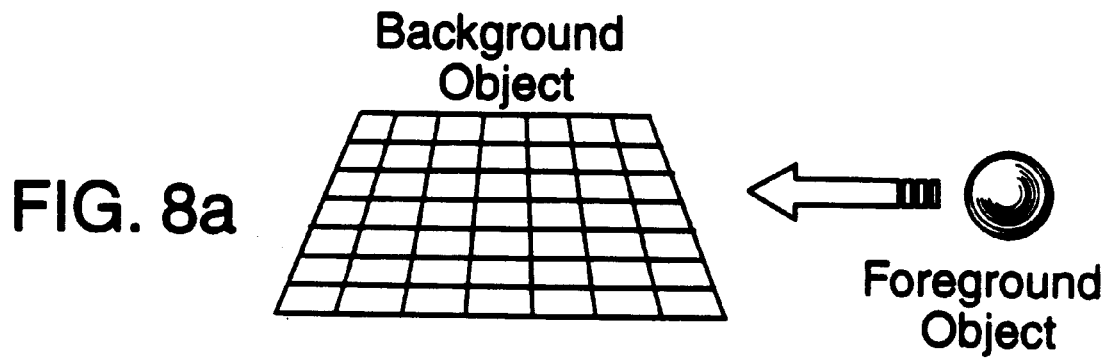
FIG. 8 illustrates vector clipping.
Figure 8B:
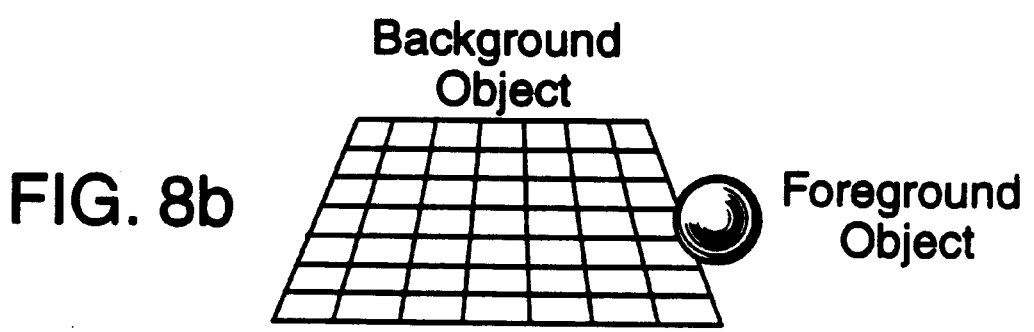
Figure 8C:
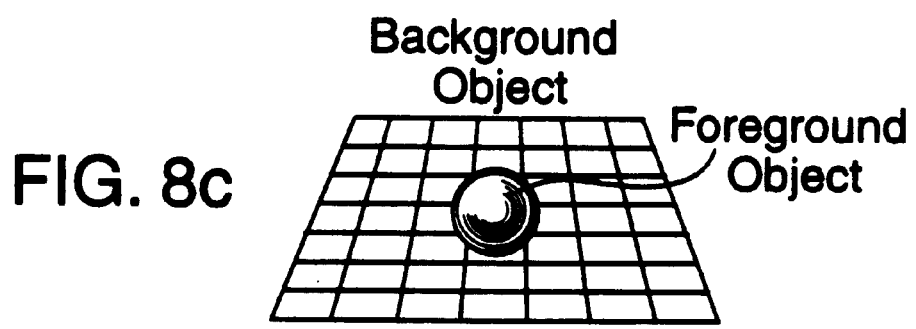

In this example, image warping based on the vector outline transformation is performed based on the left perspective image. A new set of vectors is generated for use in the warping procedure based on the object's depth arrangement. Any vector outlined object in the background which crosses vectors with the foreground objects will be clipped around the contour of the foreground object to prevent vector crossover during the warping procedure, as shown in FIG. 8. Certain vectors in the new set of vectors are allowed to crossover when the distance of the crossover is sufficiently small, thereby allowing the foreground image to fold over the background image.

Since most video media or motion picture film frames have only minute changes from one frame to the next, it is therefore possible to interpolate (i.e., "tween") the in-between object outlines for frames between the key objects' motion frames.

When motion picture film is converted to video media, the frame rate must be converted from 24 frames per second to 30 frames per second. One common way to do this is by making every fifth video media frame the duplicate of the preceding motion picture film frame. As a way of reducing the number of frames to be processed and increasing the interpolation accuracy, such redundant frames may be removed from video media prior to monoscopic to stereoscopic conversion. Of course, the redundancy must be reintroduced to the video media after processing is complete.

Since there is latency in human visual depth perception, not every video media or motion picture frame in a sequence need be converted to a stereoscopic image. G. R. Engel, "An Investigation of Visual Responses to Brief Stereoscopic Stimuli," 22 *Quarterly Journal Of Experimental Psychology,* pp. 148–166 (1970). Stereoscopic images only need to be displayed about every 300 milliseconds in order for the entire movie sequence to be a stereoscopic presentation which appears to be continuously stereoscopic. This reduces the computation needed for the conversion of monoscopic motion picture film to stereoscopic motion picture film by several orders of magnitude and results in a much quicker and easier conversion.

Figure 9A:
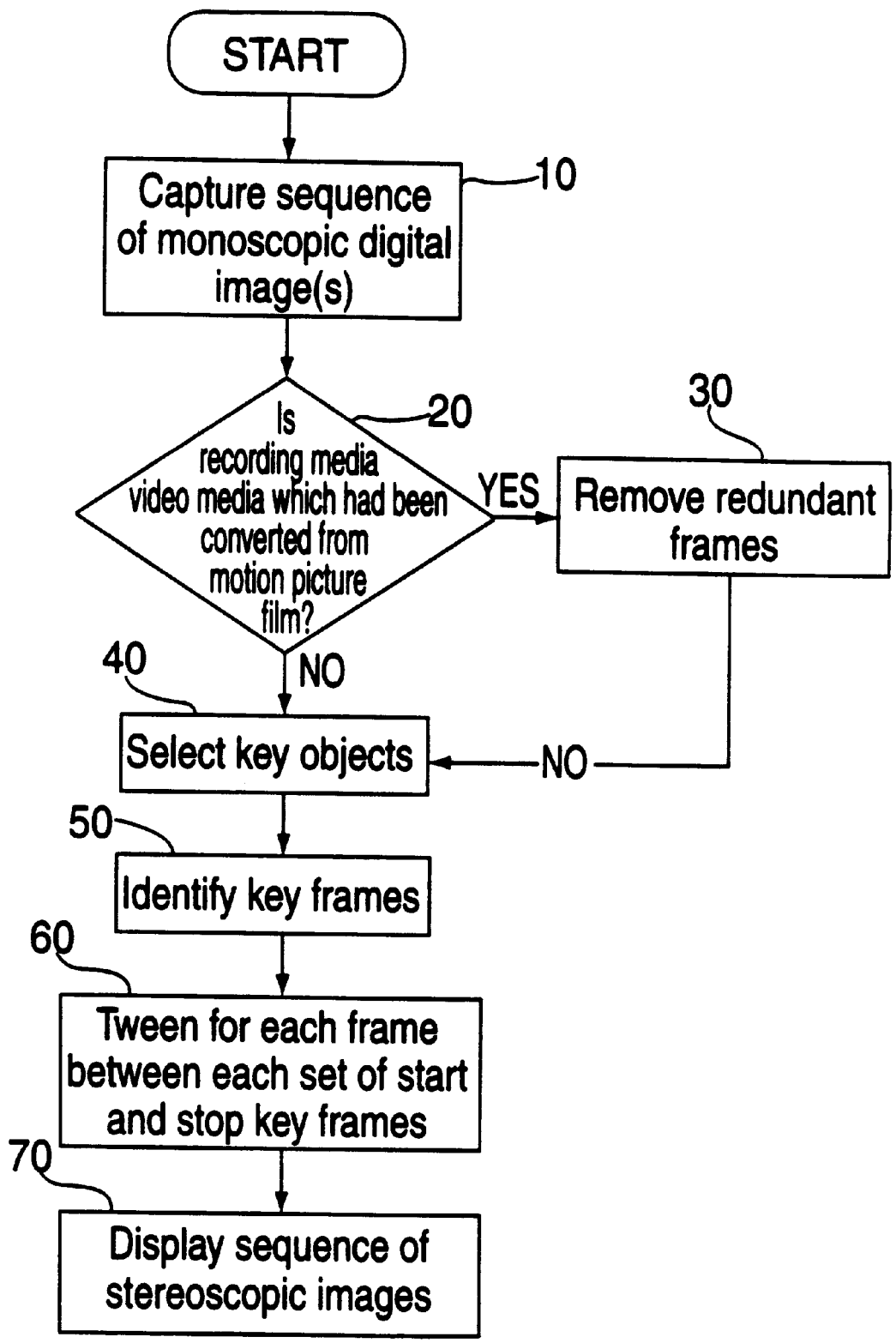
FIG. 9a is a flow diagram of a preferred embodiment of the method implemented by the apparatus.
Figure 9B:
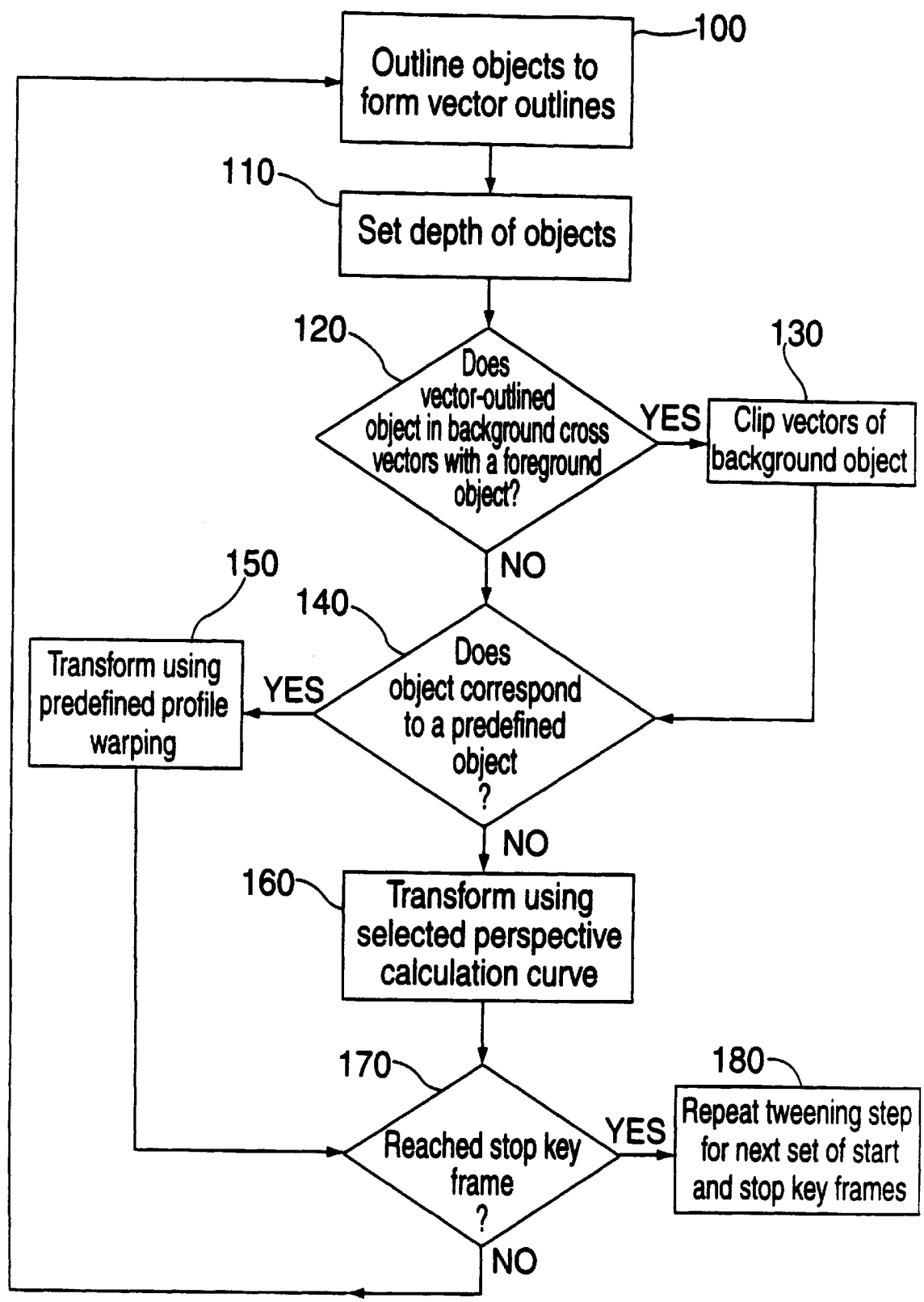

A preferred embodiment of the method of the present invention is shown in FIGS. 9*a* and 9*b*. Digital images are captured at step 10. If the digital images are from video media and were originally recorded on motion picture film, redundant frames are removed at step 30. Key objects are selected at step 40. Key frames are identified at step 50. Each frame between the start key frame and the stop key frame is tweened at step 60. Finally, the sequence of stereoscopic images is displayed at step 70. The tweening process of step 60 begins with outlining the objects to form vector outlines at step 100. The depth of objects is set at step 110. If a vector outlined object in the background crosses vectors with a foreground object, the vectors of the background object are clipped at step 130. If the object corresponds to a predefined object it is transformed using a predefined profile warping at step 150. Otherwise, the object is transformed using a selected perspective calculation curve at step 160. Unless a stop key frame is reached, process returns to step 100. The tweening process is repeated for each set of start and stop key frames.

Thus it can be seen that a method and apparatus for converting monoscopic images into stereoscopic images is provided. Although this specification describes the generation of a right perspective image based on a left perspective image, one skilled in the art will appreciate that a left perspective image can just as easily be generated from a right perspective image. Indeed, one skilled in the art will appreciate that the present invention can be practiced by other than the described embodiments, which are presented for purposes of illustration and not of limitation, and the present invention is limited only by the claims which follow.

What is claimed is:

1. An apparatus for converting a sequence of frames of monoscopic images with at least one foreground object with a depth and at least one background object to a sequence of stereoscopic images, comprising:

a foreground object identifier;

a first foreground object outliner;

a foreground object depth setter;

a second foreground object outliner;

a background object line clipper;

a foreground object point shifter; and wherein the identifier, the first outliner, the depth setter, the second outliner, and the point shifter are coupled in series.

2. The apparatus of claim 1 wherein said sequence of successive frames is derived from motion picture film.

3. The apparatus of claim 1 wherein said sequence of successive frames is derived from video med.

4. The apparatus of claim 1 wherein said sequence of successive frames contains redundant frames a result of conversion from motion picture film.

5. The apparatus of claim 4 further comprising a redundant frame remover coupled in series before said foreground object identifier.

6. The apparatus of claim 1 wherein said apparatus operates only on selected frames of said monoscopic images, thereby reducing the number of frame that must be converted to stereoscopic images, thereby reducing computation time while providing a sequence of images which appear to be stereoscopic.

7. The apparatus of claim 6 wherein said selected frames are separated by a set interval of time.

8. The apparatus of claim 7 wherein said set interval is about 300 milliseconds.

9. The apparatus of claim 1 wherein said foreground object point shifter shifts points based on said depth of said at least one foreground object and a selected perspective calculation curve.

10. The apparatus of claim 9 wherein said selected perspective calculation curve is an actual perspective calculation curve.

11. The apparatus of claim 9 wherein an operator is prevented from setting said depth of said at least one foreground object significantly beyond a neutral plane.

12. The apparatus of claim 9 wherein said selected perspective calculation curve is a modified perspective calculation curve.

13. The apparatus of claim 12 wherein said modified perspective calculation curve is a saturating perspective calculation curve.

14. The apparatus of claim 1 wherein said depth in said setting step may be varied in response to instructions from an operator.

15. The apparatus of claim 14 wherein said sequence of stereoscopic images is displayed in near real-time.

* * * * *